Jan. 30, 1968  R. V. COLLINS ET AL  3,365,813
CONTINUOUS FLOW DRYER

Filed Dec. 23, 1964

INVENTORS.
Richard V. Collins
Robert H. Hughes
Alan R. Cook
William J. Sanders
BY
Scofield, Hokjer, Scofield & Lowe
ATTORNEYS.

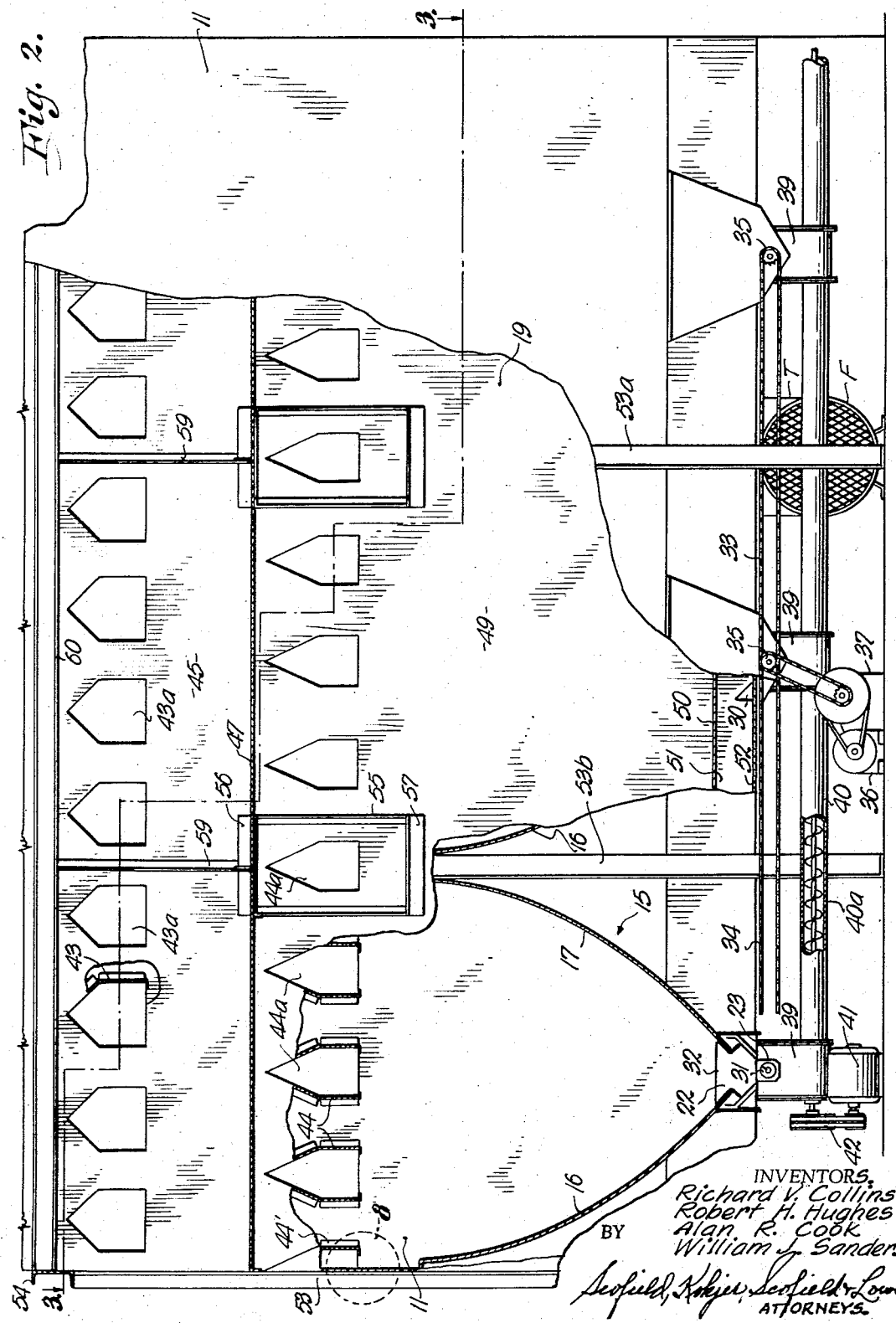

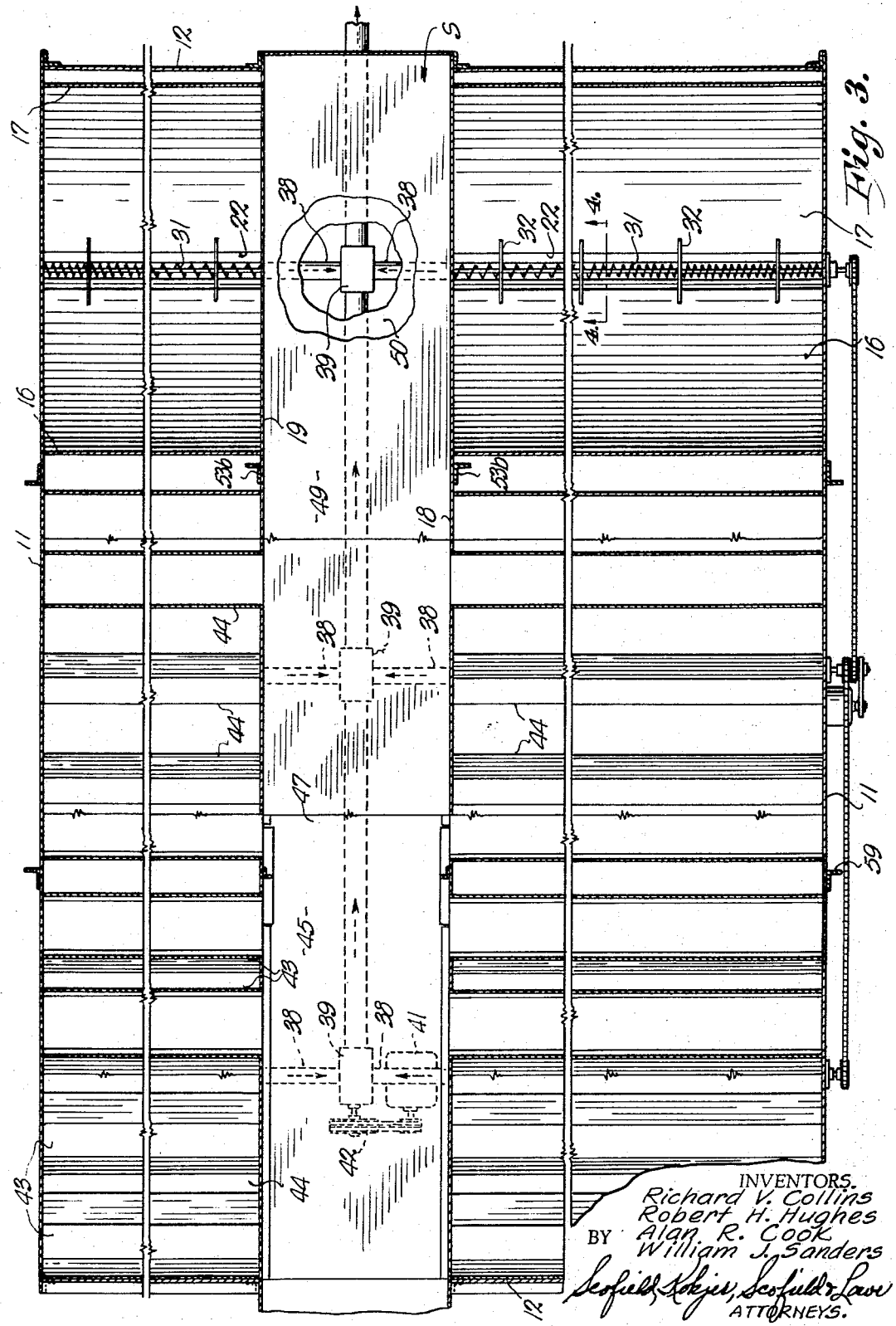

INVENTORS.
Richard V. Collins
Robert H. Hughes
Alan R. Cook
William J. Sanders
BY
Scofield, Kikjer, Scofield & Lowe
ATTORNEYS.

United States Patent Office 3,365,813
Patented Jan. 30, 1968

3,365,813
CONTINUOUS FLOW DRYER
Richard V. Collins, Shawnee Mission, Kans., Robert H. Hughes, Kansas City, Mo., and Alan R. Cook, Leawood, and William J. Sanders, Kansas City, Kans., assignors to Butler Manufacturing Company, Kansas City, Mo., a corporation of Missouri
Filed Dec. 23, 1964, Ser. No. 420,611
11 Claims. (Cl. 34—170)

ABSTRACT OF THE DISCLOSURE

An elongated hopper structure is provided with inwardly and downwardly converging lower side wall portions terminating in a bottom grain discharge opening through which grain is continually discharged along the length of the hopper structure. The upper edges of the lower side wall portions are positioned in a special relationship with heated air input and cold air exhaust conduits running lengthwise of the hopper at a level above the upper edges of said lower side wall portions, the purpose being to obtain uniform flow of grain downwardly through the hopper in response to removal of grain through said discharge opening. Means is provided for flowing air into the grain adjacent said discharge opening. A plurality of such hoppers can be joined utilizing common plenums.

---

This invention relates principally to apparatus for intimately contacting a gas with a moving mass of particulate or granular material and refers more particularly to an apparatus of this type which is specially suited for, but not necessarily limited to, the drying of grain moving through the apparatus on a continuous flow basis.

One of the principal problems encountered in continuous flow equipment for handling particulate or granular material and contacting a gas therewith is the problem of achieving a uniform time of contact of the gas with all particles in the mass while limiting the overall size of the apparatus to a commerically practical one. This is particularly true in the case of counter-flow contactors, in which the mass, whether grain mass or otherwise, flows down through a tower-like structure in which are located gas input and exhaust conduits spaced respectively at different levels in the tower, and is removed or discharged from the lower end through an outlet of considerably reduced cross-sectional area compared with the cross-sectional area of the tower proper. The "current" flow pattern of the particles in the mass as it approaches the outlet are such as to effect an uneven vertical descent rate of the material through the gas contacting zone from one side of the tower to the other. For example, one discharge hopper and outlet configuration may produce a flow pattern in which the particles in the center of the mass move through faster than those near the side walls. Another may produce essentially the opposite results. In either case, the unevenness of the flow rate causes a similar unevenness in the drying time to which the particles are subjected with the result that drying is not uniform.

A principal object of the present invention is to provide apparatus for handling particulate or granular materials on a continuous flow basis and which overcomes the problems set forth above. By virtue of our structure we are able to provide a pattern of movement of the material mass through the gas contacting zone which is substantially uniform throughout the cross-section of the zone even though discharge in the material is through a hopper and outlet of restricted cross-section.

Another important object of the present invention is to provid apparatus of the character described which is so constructed that plurality of identical modular units can be connected in clusters to produce a high volume operation. A feature of the invention resides in the manner of assembly of the cluster and the components associated therewith so as to obtain ease in operation.

A further object of the invention is to provide apparatus of the character described which has facilities for introducing to the mass at a location adjacent the discharge outlet another gas which can percolate upwardly through the mass. In the specific embodiment of the invention, this arrangement is employed for causing the trickling of cool air through the heated mass which is descending from the drying zone.

Another object of the invention is to provide apparatus of the character described which is relatively easy to construct and which is efficient and simple in its operation.

Other and further objects of the invention, together with the features of novelty appurtenant thereto, will appear in the course of the following description.

In the accompanying drawings, which form a part of the specification and are to be read in conjunction therewith, and in which like reference numerals indicate like parts in the various views;

FIG. 2 is an enlarged fragmentary side elevational view taken generally from the right hand side of FIG. 1, but showing at successive points by means of breakaways the plenum chamber between the parallel dryer modules and a section through a module between the outside wall of said module and the plenum chambers;

FIG. 3 is a sectional view taken generally along the line 3—3 of FIG. 2 in the direction of the arrows, the break lines indicating interrupted width of the parallel rows of modules;

Figure 1:
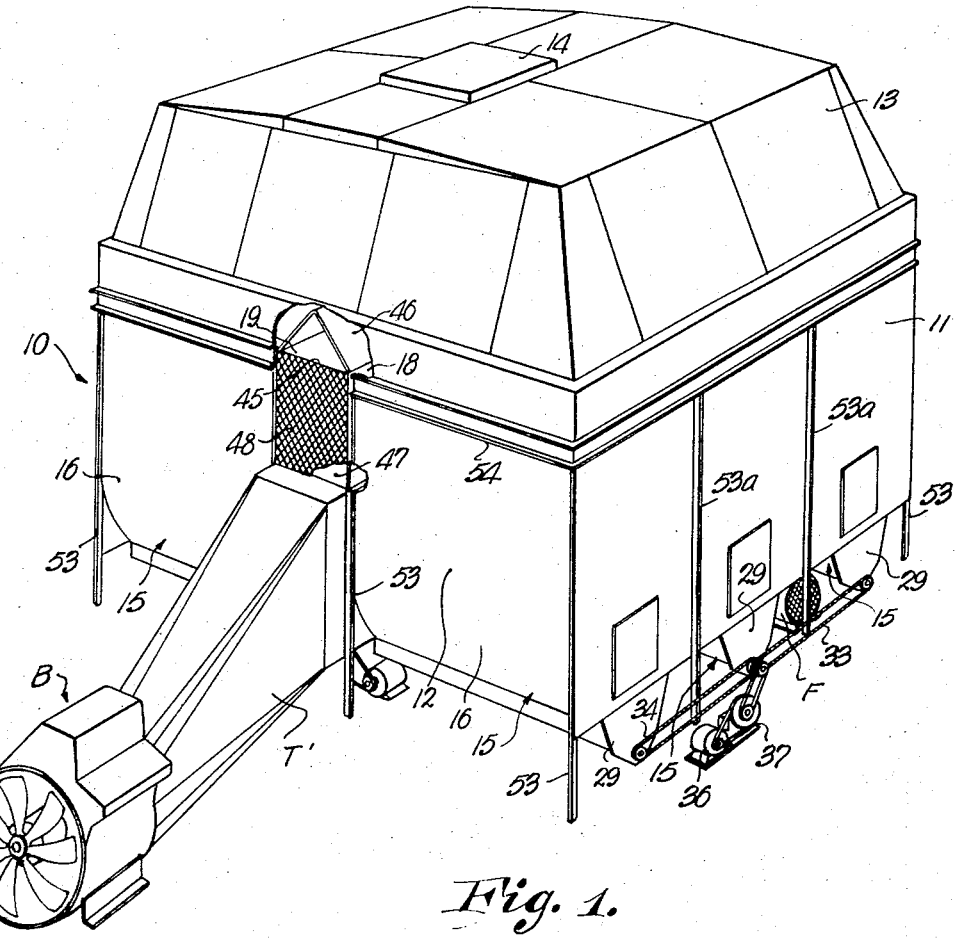
FIG. 1 is a perspective view of a preferred six hopper continuous flow grain dryer embodying our invention.

Referring now to the drawings, we have selected for purposes of describing our invention, its application in a grain dryer. As the description proceeds, it will be evident that the principles and concepts involved are equally applicable to the handling and treatment of bulk materials other than grain. Accordingly, we do not desire to be limited to grain dryers alone.

A complete grain dryer is illustrated by the reference numeral 10, this grain dryer having the parallel end walls 11 and side walls 12. The upper section 13 of the dryer has the top hatch 14 which can be opened so that grain can be introduced therethrough by any suitable means, for example, an elevator spout (not shown). In normal use, on a continuous flow basis, the hatch 14 will always be open in order that grain can be introduced in a steady stream or by successive loads.

The illustrated dryer has six separate but substantially identical discharge hopper sections 15 arranged in side by side fashion in two parallel rows of three hopper sections each. The rows are parallel with the planes of the end walls 11. The hopper sections in each case are rectangular in horizontal cross-section, having parallel end walls, one of which is formed by an end wall 11, and downwardly converging curved side walls 16, 17. The inner end walls of the respective rows are defined by vertical sheets 18, 19 (FIGS. 1 and 3) which are spaced laterally from one another to form the sides of the plenum space located between the hopper rows. As will subsequently be seen, this space is subdivided to provide three separate plenum chambers through which input and exhaust air are flowed.

Figure 4:
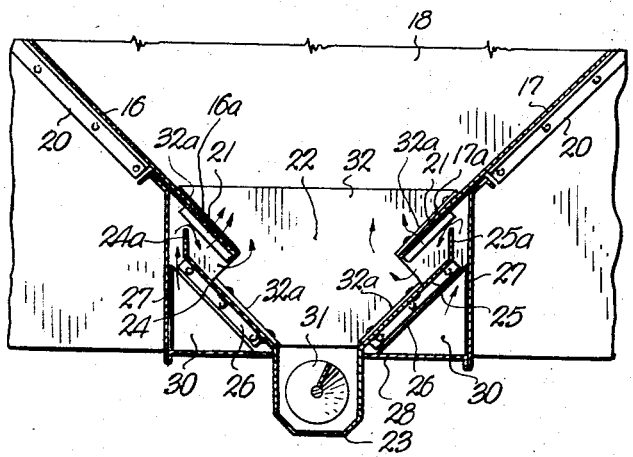
FIG. 4 is a greatly enlarged fragmentary cross-sectional view taken along the line 4—4 of FIG. 3 in the direction of the arrows.

The general construction of each of the hoppers is essentially the same and consequently only one will be described in detail. As earlier noted, side walls 16, 17 are smoothly curved downwardly and turned inwardly toward one another. As can be seen in FIG. 4, the opposite end edges of the hopper sides 16 and 17 can be joined respectively to the end panels 18 and 11 or 19 and 11, depending on the row in which the hopper is located, by angle sections 20. The lower ends of the curved side walls are indicated respectively at 16a and 17a in FIG. 4; however, these ends have secured thereto continuation members 21 which are provided with a multiplicity of fine perforations, the perforations preferably being smaller than the grains to be handled in the dryer. The lower ends of the perforate members 21 are spaced apart along their length to define an elongate grain discharge opening 22 running the full length of the hopper.

The discharge opening 22 of each hopper communicates with and leads into an elongate sump defined generally by the U-shaped auger trough 23 and the upwardly diverging side or wing sections 24, 25, which proceed from the upper edges of the trough 23. The side sections 24, 25 extend under and are spaced below the foraminous hopper end members 21 and are provided in each case with the vertically bent upper flanges or lips 24a, 25a. Angle sections 26 may be employed to connect the ends of the sumps wing sections 24, 25 with the end panels 11, 18 and 19.

The sump side sections are enclosed in a box-like housing having the vertical sides 27 and the bottom wall 28. The auger trough 23 depends through a correspondingly sized opening in the bottom wall 28. The outer end of each housing, i.e., that end toward the outside of the overall structure, is closed by an end plate 29 (FIG. 1) which also, in this particular apparatus, acts along with panels 11 to enclose the corresponding end of the hopper. At the other, or inner, end the interior of each box or housing communicates with the space between the hopper rows by means of triangular openings 30 which are cut through the respective inner end sheets 18, 19. As will be seen, cooling air is delivered through these openings and flows along the length of the sumps and upwardly around the sections 24, 25 thereof into the grain mass in the hopper through and around extensions 21.

Figure 5:
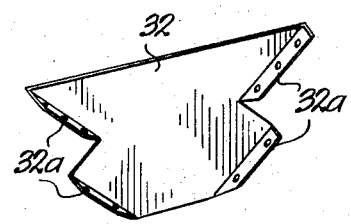
FIG. 5 is an enlarged perspective view of a typical divider baffle.

Each auger trough 23 has located therein a screw auger 31 which is so formed and driven as to move material lengthwise of the trough toward the center section of the unit. In order that equal amounts of grain be withdrawn from the hopper at all points along the length of the sump, the auger is provided with a uniformly stepped increasing pitch proceeding in the direction of discharge (see FIG. 3). To assist in maintaining the uniform flow, baffles 32 are spaced from one another along the length of the hopper opening. A typical baffle is illustrated in FIG. 5 and as can be seen therefrom, the baffle is cut to interfit with the overlapping perforated sections 21 and diverging wing sections 24, 25. Flanges 32a are provided by which the baffles can be riveted or otherwise fastened in place.

As can best be seen in FIG. 3, the augers 31 for corresponding hoppers in the two rows are connected to turn as a single unit and are driven from one end by means of a drive system involving chains 33 and 34 which are trained over sprockets 35 located on the ends of the auger shafts. A motor 36 (FIG. 1) is drivingly connected through a speed reducer 37 with the chains and serves to turn all of the augers 31 simultaneously.

The portions of augers 31 extending beyond the inner ends of the hoppers are encased in auger tubes 38 which are joined by the receiving sections 39 at the center of the unit. These sections in turn open downwardly into a discharge auger tube 40 running lengthwise of the unit below the augers 31. The outlet end of the auger tube 40 can be connected as desired with an elevator or other collection means (not shown). The auger 40a in tube 40 is driven by its own motor 41 through the belt drive 42.

Proceeding now to further description of the upper portion of the unit, each hopper section 15 has disposed above it a gas contacting zone which is defined by upper and lower rows of exhaust and input conduits extending respectively from the inner walls 18, 19 toward the corresponding outer side walls 11. The conduits in the upper row, which in the illustrated embodiment are the exhaust conduits, are in each case identified by reference numeral 43; those in the lower row, the input conduits, by 44 and 44'. Reference numeral 44' in fact identifies a half conduit, the importance of which will be discussed at a later point herein.

The exhaust conduits 43 are spaced uniformly along the length of the dryer with each conduit parallel with the others. The conduits are of generally inverted channel cross section, the base of the channel being sharply formed as a V so that material will be diverted cleanly toward opposite sides thereof as it descends thereby. The bottoms of the conduits are open. Those ends of the conduits abutting the outside walls 11 are closed by the wall itself. The inner ends, i.e. those ends adjacent the inner walls 18 or 19, communicate through individual openings 43a with the plenum space S earlier described. The openings conform in shape with the shape of the conduit.

The lower conduits 44 and 44' are shaped much like the upper conduits 43, although they are somewhat narrower. They are located centrally below adjacent pairs of the upper conduits 43 with the peaks of the conduits 44 in vertical planes which bisect the associated upper conduits. The lower conduits 44, like the upper conduits 43, are closed at the ends adjacent the outside walls 11. They open into the plenum space through individual openings 44a. While FIG. 2 shows the openings in only one inner wall, namely the wall 19, it will be understood that the unit is symmetrical with respect to a lengthwise central vertical plane and consequently that the same pattern of openings and conduits would be visible should the same section be taken looking toward wall 18. The half conduits 44' are located in the preferred embodiment only adjacent the opposite ends of the unit. However, as will subsequently be seen, those conduits 44 which overlie the joint between two hopper sections 15 in effect form half conduit sections for those hoppers.

It is important to observe that the conduit arrangement above each hopper section 15 is symmetrical with respect to a transverse plane through the center of the hopper section. In other words, referring to FIG. 2 at the left side of the figure, it will be noted that there are four upper conduits 43 and that these are located at equal spacings on opposite sides of the vertical center line of the hopper section. There are likewise a total of four lower conduits for the hopper section 15, three whole ones and a fourth which is formed by the half section 44' and the equivalent half section described earlier, at the other side. These are also symmetrical about the vertical center line. The conduit arrangement for each hopper section in the unit is substantially the same, as should be evident from the foregoing description and the drawings.

The plenum space S located between the inner walls 18, 19 is subdivided into three plenum chambers which run the full length of the unit. The uppermost plenum chamber 45 is defined by an inverted V-shaped upper wall 46 (see FIG. 1) running the complete length of the unit and forming a roof over the plenum space. The lower boundary of the upper plenum chamber 45 is defined by the horizontal panel or plate 47 which likewise runs the complete length of the unit. The plenum chamber 45 is in communication with the openings 43a. The plenum chamber 45 can be open at both ends, or, as shown, closed at one end and covered with a screen 48 at the other end, as can be seen in FIG. 1.

The intermediate plenum chamber is indicated by reference numeral 49 and is defined by the spaced inner walls 18, 19, the upper panel or plate 47, and a lower plate 50. The plate 50, like plate 47, runs the full length of the unit and is in a horizontal plane. It is closed at one end and is open at the other, the open end communicating with the heater and blower system B illustrated in FIG. 1. The combined heating and blower unit B is connected with the intermediate plenum chamber through the medium of the transition section T'.

The intermediate plenum chamber 49 serves as the input plenum in the illustrated unit, while the upper plenum chamber 45 serves as the discharge plenum.

The third plenum chamber is one of very small height adjacent the floor of the bin and is identified by reference numeral 51. It is defined at its upper boundary by the plate 50 and at its lower by the floor plate 52. The plenum chamber 51 communicates through openings 30 with the housing spaces which run along the sump and which have been described earlier herein as for cooling air. The bottom plenum chamber 51 receives cooling air from a fan assembly F which is connected therewith through an appropriate duct and transition arrangement T (FIGS. 1 and 2).

Figures 6, 7:
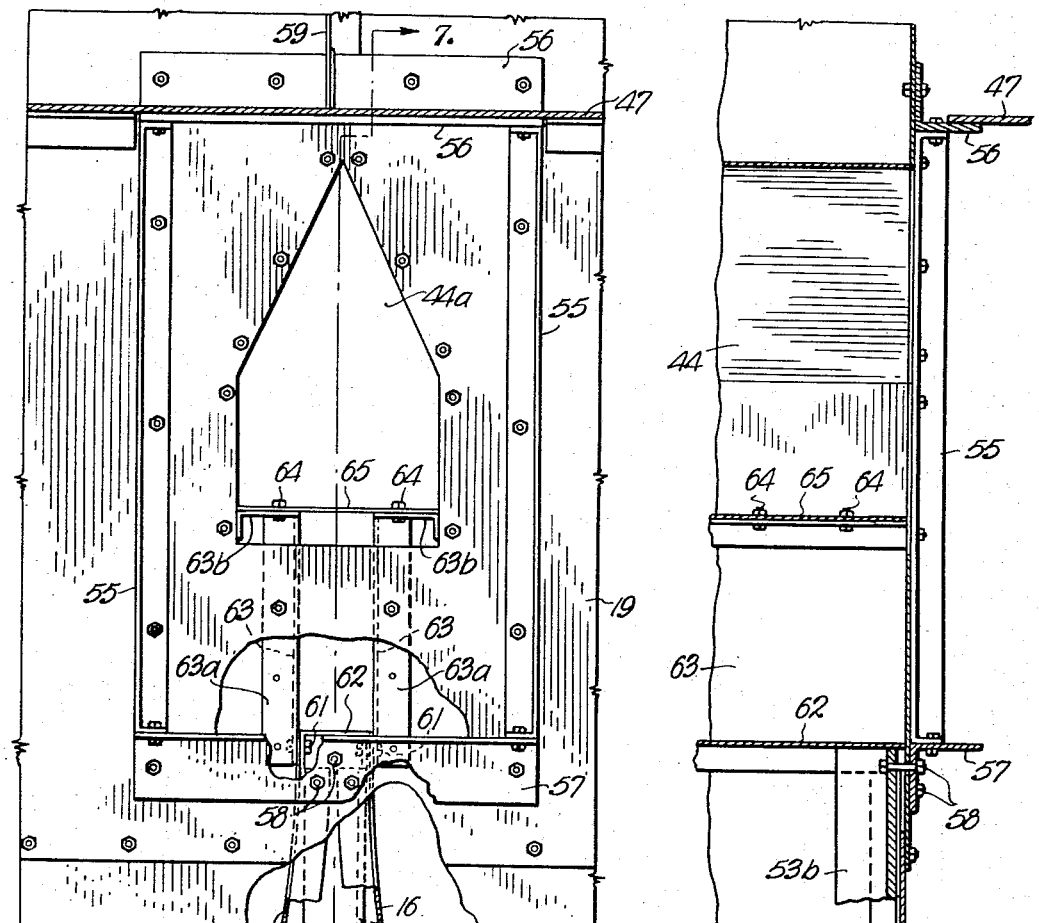
FIG. 6 is a greatly enlarged elevational view of the load transition structure and illustrating a joint between adjacent modules, parts being broken away for purposes of illustration.
FIG. 7 is a sectional view taken along line 7—7 of FIG. 6 in the direction of the arrows.

The overall dryer unit is supported on a total of sixteen legs 53, 53a, 53b, arranged in rows of four, which rows are parallel with the end walls 11 and substantially coincide with the planes of walls 11 and the respective inside walls 18 and 19. At the sides of the unit, the legs 53 at the opposite ends of the rows can be connected with the upper structure in any suitable fashion, such as by means of a channel beam 54 at each end of the unit, and which runs crosswise of the unit (FIG. 2). The intermediate legs 53a on the outside side walls 11 can be secured to those walls. However, the four intermediate legs 53b have a special load transition arrangement through the lower exhaust conduit area which is detailed in FIGS. 6 and 7, and which will now be described.

As can be seen, each conduit opening 44a through which a leg 53b would normally pass has arranged around it a rectangular frame made up of the vertical side members 55 of angle cross section which are bolted to the wall 19 along their length and by an upper angle section 56 and a lower angle section 57. The flanges of sections 56 and 57 are secured to the ends of vertical elements 55 by appropriate brackets and bolts. The upper end of post 53b is bolted to the vertical flange of the horizontal member by means of bolts 58. Above the frame a vertical angle member 59 extends on up from the upper cross member 56 to pick up the channel beam 60 (FIG. 2) which runs the length of the unit. There is one such beam on each side of the plenum space.

It will be noted that the upper edge portions of the adjacent curved side walls 16 and 17 of adjacent hoppers 15 are located centrally beneath a conduit 44 and that opposite portions of that conduit overhang each hopper. In other words, the particular conduit 44 at the adjacent side walls is centered with respect thereto. The upper edge portions of walls 16, 17 are bolted as at 61 to a channel 62 running across the unit beneath the conduit. Located above and secured to this channel are the spaced upright wall sections 63 which in effect form vertical upper continuations of the respective adjacent hopper walls 16, 17. The vertical wall sections are flanged at their ends as at 63a to provide a means for fastening same to the walls 19 (and 18) as well as walls 11, and have the reversely bent upper flanges 63b which are bolted along their length by bolts 64 with the horizontal spacers 65. The spacers 65 are of short length and the flanges 63b are perforated over their full length outboard of the walls 63 (much like the arrangement shown in FIG. 9 and described in connection therewith at a later point herein) so that air can pass out of the conduits into the zones above the respective hoppers.

Figures 8, 9:
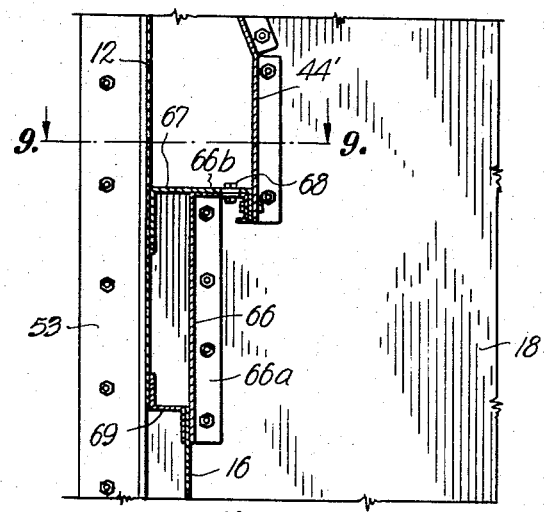
FIG. 8 is an enlarged fragmentary elevational view of a typical joint between the upper hopper edge and the side structure illustrating generally that section ringed by ring 8 in FIG. 2.
FIG. 9 is a fragmentary sectional view taken along line 9—9 of FIG. 8 in the direction of the arrows.

The construction below the half conduits 44' is essentially the same as above so far as spacing and location of the hopper side wall with respect to the conduit is concerned. Referring to FIGS. 8 and 9, the upper edge of the curved side wall 16 has connected therewith an upward vertical extension in the form of panel 66 having end flanges 66a at opposite ends which bolt to the walls 11 and 18 or 19, depending on which side of the unit the hopper is located. An inverted channel shaped spacer 67 fills and extends along the lower end of conduit 44'; to this the upper edge of panel 66 is joined by flanging the latter at 66b and connecting it to the spacer by bolts 68. The spacer is fastened by suitable means such as welds or bolts (not seen) to the end wall 12. It is perforated as at 66c along its length so that gas in the conduit can flow outwardly into the zone above the hopper. A Z-clip 69 serves to maintain the desired spacing between the lower edge of wall 12 and the curved hopper wall.

The offset of the vertical upper edges of walls 16, 17 and the respective continuation 63 or 66, as the case may be, with respect to the half conduits 44' and the half sections of the whole conduits 44 which lie between and above the hopper sections, is important in two respects. First, it provides room in which a beam like structure can be achieved, thus providing the necessary support at the hopper joints. Secondly, and of even greater importance, it has been found by us that this offset must be present in order to obtain a uniform flow rate in the entire mass of material moving downwardly between the exhaust conduits 43 and the input conduits 44. The degree of offset is approximately ¼ to ⅓ the total width of a conduit 44 (½ to ⅔ the width of a half conduit 44') measured as in from the lower edge of the conduit toward the center thereof.

The shape of the hopper side walls 16, 17, including their upper continuations 63, 66, is also important. We find that by far the best results are experienced with vertical upper sections, a curved central intermediate portion and essentially straight lower portions converging at an included angle of from 60° to 90° with respect to each other. For use with a wide variety of materials of differing flow characteristics it would be well to make the upper edge portions of the curved side walls of the hopper adjustable laterally in and out or toward and away from one another.

The width of the opening at the bottom of the hopper bears a ratio to the length of approximately 1 to 16, or one inch for each sixteen inches of length.

In operation the unit is filled with grain, for example, and the combined blower and burner unit B started. The heated air is forced into the plenum chamber 45 through the transition T' and distributes itself along the length thereof and flows into the lower rows of conduits 44 through the opening 44a. The air of course flows along the length of the conduits and when pressure is built up, down under the edges of the conduits 44 and upwardly through the grain. By virtue of the staggered spacing, the rising air is intercepted in the open bottoms of the upper conduits 43, is conducted therealong to the upper plenum chamber 45 through openings 43a and out through the screened discharge openings at 48. It is important to note that the conduit arrangement employed, particularly along the lower rows, is such that uniform quantities of air are delivered to all portions of the mass moving downwardly in the zone between the upper conduits and lower conduits.

The grain is moved in continuous fashion through the dryer by means of the auger system involving the individual hopper augers 31 and the central collecting and end discharge auger 41. By reason of the use of a step pitch on the hopper augers 31, and the inclusion of the spacers 32, uniform quantities of grain per unit length of the trough are removed, thus insuring that the descent velocity at opposite ends of the hopper is the same. It is in fact the uniform takeout along the length of the bottom of the hopper, coupled with the special arrangement of hopper side walls and air input ducts that produces the desired uniformity of movement through the drying zone.

The upper portion of the overall unit, that is that portion which is located above the exhaust conduits 43 can properly be regarded as the holding zone. It can be completely filled in order to provide a continuously available supply to the drying zone. In other words, by providing the holding zone, trucks or other batch carriers can be utilized to keep the dryer in operation, the holding zone providing the necessary supply during the intervals that the truck or other carrier may be absent.

Cooling of the grain or other material prior to discharge is achieved through use of the blower F and the flow induced thereby through the lower plenum chamber 51. As earlier explained, this air, which is atmospheric air, is drawn in by the blower F, forced through the transition T into the lower plenum chamber 51, and from thence into and along the respective discharge troughs through the side openings 30 in the plenum. The air flows along the length of the auger trough and as shown in FIG. 4, into the grain through the space provided between the perforated plates and wings 25. Air also can flow through the perforated plates themselves. This air, of course, is supplied at a much lower flow rate and in effect trickles up through the material in the hopper.

The initial material put into the unit and which is not subjected to drying can be recycled as desired once the unit has been started in its continuous cycle.

While the preferred embodiment of the unit has been shown as a grain dryer, it will be understood that the same arrangement may be employed for contacting gases with other materials, whether the gases be air or something else. Also, it will be evident that the basic principles are as adaptable to a single hopper unit as to a multiple hopper unit. However, the design lends itself particularly well to assembly of more than one hopper in a complete unit.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In a bulk material handling apparatus, the combination of
  a hopper having parallel vertical end walls and downwardly converging side walls, said side walls having upper edges and terminating respectively in spaced parallel lower edges defining an elongate opening therebetween,
  a plurality of horizontally spaced parallel conduits extending across the upper end of said hopper between said end walls, said conduits of channel shape with the open side of the channel down, said conduits comprising at least one whole conduit and two half-conduits with the half-conduits half the width of the whole conduit and overlying the respective upper edges of said side walls so that a vertical plane through each said upper edge is located between the inner and outer lateral extremities of the respective half-conduits,
  the whole conduit or conduits being symmetrcally spaced between the half-conduits, and
  discharge means for removing material at a uniform rate along the length of said opening.

2. Apparatus as in claim 1 wherein each said side wall includes a vertical upper portion terminating in said upper edge, an incurved arcuate intermediate portion proceeding below said upper portion and an inclined straight bottom portion proceeding from said intermediate portion, the side walls being symmetrical with respect to a central plane through the unit normal to the end walls.

3. Apparatus as in claim 2 wherein said bottom portions of said side walls are arranged with respect to one another at an included angle of from substantially 60° to 90°.

4. Apparatus as in claim 1 including a sump trough disposed below and lengthwise along said opening for receiving material therethrough, gas passageways running lengthwise of and on opposite sides of said sump trough and communicating with said opening substantially along the length thereof, and means for flowing gas into said passageways for discharge into said opening.

5. In a bulk materials handling apparatus, the combination of
  a structure having an upper section and a hopper section,
  said upper section of substantially rectangular cross-section with parallel opposed end and side walls,
  said hopper section having end walls substantially coplanar with and continuing downwardly from the end walls of said upper section and side walls which converge inwardly toward one another and terminate in bottom edges spaced from one another to define therebetween an elongate opening at the bottom of the hopper section,
  the upper edges of said hopper side walls being inset from the plane of the corresponding side walls of the upper section,
  a plurality of substantially coplanar gas input members extending between the end walls of said upper section,
  a plurality of substantially coplanar gas exhaust members also extending between the upper section end walls but at a different elevation than said input members,
  the outermost of said gas input members overlying the inset upper edges of the hopper side walls, and
  discharge means for removing material at a uniform rate along the length of said openings.

6. Apparatus as in claim 5 including a sump trough disposed below and lengthwise along said opening for receiving material therethrough, gas passageways running lengthwise of and on opposite sides of said sump trough and communicating with said opening substantially along the length thereof, and means for flowing gas into said passageways for discharge into said opening.

7. Apparatus as in claim 5 including means for introducing gas into said hopper section adjacent said opening for flow upwardly through said hopper section.

8. Apparatus as in claim 5 wherein said input members comprise conduits closed along the top thereof and open along the bottom, and in which the said outermost conduits are adjacent the upper section side walls and vertically overlie the upper edges of said hopper side walls.

9. In a bulk materials handling apparatus, the combination of
  a first row of side by side hoppers, each having end walls in common planes and downwardly converging side walls terminating in an elongate discharge opening at the bottom of each hopper, said openings being parallel and spaced from one another along the length of the row,
  a second, like row of hoppers arranged with the end walls thereof parallel with the end walls of the hoppers of said first row and with one end wall of the second row in spaced confronting relationship with one end wall of the first row, thus defining a space between said rows, means forming with the other end walls of the respective rows and the outside side walls of the endmost hoppers of each row an enclosed zone above the hoppers for receiving material, a cap for the said space between the hoppers sealing said space from said zone, means for removing material from each of said hoppers at the discharge openings thereof at a uniform rate at all hoppers, and means for contacting a gas with the materail descending to each hopper from said zone .

10. The combination as in claim 9 wherein said last mentioned means comprises a source of gas under pressure, means subdividing said space and forming a plenum chamber connected with said source, and a plurality of input conduits for each hopper row and extending between the end walls of such row at an elevation between the holding zone and the discharge opening of the hopper and in communication through openings in said one end walls with said chamber.

11. The combination as in claim 10 including a plurality of exhaust conduits positioned above said input conduits and operable to receive gas discharge through said input conduits and flowed upwardly toward said discharge zones.

References Cited

UNITED STATES PATENTS

| Re. 25,230 | 8/1962 | Pierpont | 34—55 |
| 558,508 | 4/1896 | Metcalf | 34—170 |
| 640,791 | 1/1900 | Morris | 34—174 X |
| 1,157,172 | 10/1915 | Morris | 34—174 X |
| 2,660,810 | 12/1953 | Hess | 34—170 |
| 2,701,920 | 2/1955 | Campbell | 34—170 X |
| 3,053,522 | 9/1962 | Applegate | 34—174 X |
| 3,267,588 | 8/1966 | Timmons | 34—174 |

FREDERICK L. MATTESON, JR., *Primary Examiner.*

C. R. REMKE, H. B. RAMEY, *Assistant Examiners.*